(12) United States Patent
Torres et al.

(10) Patent No.: US 9,413,232 B2
(45) Date of Patent: Aug. 9, 2016

(54) DROOP REDUCTION CIRCUIT FOR CHARGE PUMP BUCK CONVERTER

(71) Applicant: Texas Instruments Incorporated, Dallas, TX (US)

(72) Inventors: Erick Omar Torres, Allen, TX (US); Byungchul Jang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/734,720

(22) Filed: Jun. 9, 2015

(65) Prior Publication Data

US 2015/0381035 A1    Dec. 31, 2015

Related U.S. Application Data

(60) Provisional application No. 62/019,117, filed on Jun. 30, 2014.

(51) Int. Cl.
| | |
|---|---|
| *H02M 3/07* | (2006.01) |
| *H02M 3/158* | (2006.01) |
| *H02M 3/16* | (2006.01) |
| *H02M 3/156* | (2006.01) |
| *H02M 3/28* | (2006.01) |
| *H02M 1/00* | (2006.01) |

(52) U.S. Cl.
CPC .............. *H02M 3/07* (2013.01); *H02M 3/156* (2013.01); *H02M 3/1582* (2013.01); *H02M 3/16* (2013.01); *H02M 3/285* (2013.01); *H02M 2001/009* (2013.01)

(58) Field of Classification Search
CPC ......... H02M 3/07; H02M 3/16; H02M 3/156; H02M 3/285; H02M 2001/009; H02M 3/1582; G11C 5/145

See application file for complete search history.

(56) References Cited

U.S. PATENT DOCUMENTS

| | | | |
|---|---|---|---|
| 6,703,812 B1 | 3/2004 | Lethellier | |
| 7,518,346 B2 * | 4/2009 | Prexl | H02M 3/1582 323/222 |
| 7,777,459 B2 * | 8/2010 | Williams | H02M 3/07 323/266 |
| 8,643,347 B2 * | 2/2014 | Giuliano | H02M 3/07 323/266 |
| 8,854,019 B1 | 10/2014 | Levesque et al. | |
| 2015/0145497 A1 * | 5/2015 | Torres | H02M 3/158 323/283 |
| 2016/0072387 A1 * | 3/2016 | Schmalnauer | H02M 3/1582 323/271 |

* cited by examiner

*Primary Examiner* — Jung Kim

(74) *Attorney, Agent, or Firm* — Michael A. Davis, Jr.; Frank D. Cimino

(57) ABSTRACT

A Charge Pump Buck Converter (CPBC) includes a BC including an inductor and a CP coupled in parallel. Control logic is coupled to a switch driver coupled to a power switch (es). Control circuitry includes a voltage sensor sensing Vout and a voltage level generator for generating a first voltage level coupled to the CP stage and a second voltage level coupled to a duty cycle/rate generator block providing an input to an under voltage (UV) monitor coupled between OUT and the control logic. The control circuitry disables the CP when Vout>a first Vout level and controls the BC to regulate to a second Vout level>the first Vout level. During handoff between CP and BC during power up if Vout drops below a UV threshold, the UV monitor block modifies an input applied to the control logic for increasing charging supplied to the inductor.

17 Claims, 4 Drawing Sheets

DROOP REDUCTION CIRCUIT FOR CHARGE PUMP BUCK CONVERTER

CROSS REFERENCE TO RELATED APPLICATIONS

This application claims the benefit of Provisional Application Ser. No. 62/019,117 entitled "Droop Avoidance Circuit for Buck/Charge-Pump Step-Up and Step-Down Converter", filed Jun. 30, 2014, which is herein incorporated by reference in its entirety.

CROSS-REFERENCE TO COPENDING APPLICATIONS

This application has subject matter related to copending application Ser. No. 14/088,012 entitled "Low-loss step-up and step-down voltage converter" filed Nov. 22, 2013.

FIELD

Disclosed embodiments relate to DC-DC switch mode voltage converters.

BACKGROUND

Voltage converter circuits are common components of many electrical and electronic systems having loads that are to be driven by regulated DC voltages. For example, many electronic systems include integrated circuits and other loads that require a relatively stable DC voltage. As such, these systems typically include a DC power supply for converting unregulated DC input power received from a battery, or from an AC line voltage via a rectifier, into a stable regulated DC power output to be applied to the integrated circuit or other system loads, such as a DC motor.

One common type of DC-DC voltage converter circuit that is commonly included in DC power supplies is referred to in the art as the switch-mode DC-DC voltage converter. As known in the art, switch-mode DC-DC "buck" converters (or "step-down" converters) produce an output voltage that is lower, on average, than its input voltage, while "boost" converters (or "step-up" converters) produce an output voltage that is higher, on average, than its input voltage. Modern conventional regulated DC power supplies often include a switch-mode DC-DC converter of a "buck-boost" topology, which is effectively a combination of the "buck" and "boost" converter circuit types. Buck-boost voltage converters are capable of producing an output voltage that may be either higher or lower than the received input voltage.

SUMMARY

This Summary briefly indicates the nature and substance of this Disclosure. It is submitted with the understanding that it will not be used to interpret or limit the scope or meaning of the claims.

Disclosed embodiments include charge pump buck power converters (CPBCs) which recognize existing buck-boost converter solutions for providing power from an off state through a low-voltage, low-power DC power supply all the way to a high-voltage, high-power DC power supply when active are of low power efficiency, require a large circuit area and have significant resistive losses as compared to a CPBC. Disclosed CPBCs combine a charge pump (CP) stage for step-up conversion and a buck converter (BC) stage for step-down conversion that are in parallel to one another between an input terminal (IN) and an output terminal (OUT) of the CPBC.

The CPBC includes control circuitry comprising a voltage sensor and a voltage level generator coupled to the CP stage providing a CP control loop for disabling the CP stage upon the voltage at OUT (Vout) reaching a first voltage level (first Vout level) and coupled to the BC stage providing a BC control loop for enabling the BC stage at a second Vout level above the first Vout level and controlling the BC stage to regulate at the second Vout level. The BC control circuitry also includes an under-voltage (UV) monitor block for reducing a recognized Vout droop while the BC control loop is settling when handing off from the CP stage to the BC stage during voltage step down conversion that can occur for relatively rapid input voltage (Vin) ramp rates relative to the BC control loop bandwidth (see Vout shown in FIG. 3A described below). A significant Vout droop during switching is generally not allowed in most system applications.

Regarding operation of the CPBC, during power up when Vin is ramping up from a low voltage (e.g., ground) to its eventual steady state voltage in normal operation the CP stage first turns on, and then during handoff the BC stage turns on to perform step-down conversion and then the CP stage disables, where the BC stage limits Vin to an intended voltage (i.e., second Vout level) when Vin>the intended voltage (i.e., second Vout level). The UV monitor block in disclosed BC control loops causes the BC control loop during CP stage to BC stage handoff to provide enough energy to the inductor of the BC stage to maintain a higher Vout level than the BC control loop would otherwise provide to minimize the Vout droop (see simulation results in FIG. 3B described below showing essentially no Vout droop).

BRIEF DESCRIPTION OF THE DRAWINGS

Reference will now be made to the accompanying drawings, which are not necessarily drawn to scale, wherein.

DETAILED DESCRIPTION

Figure 1:
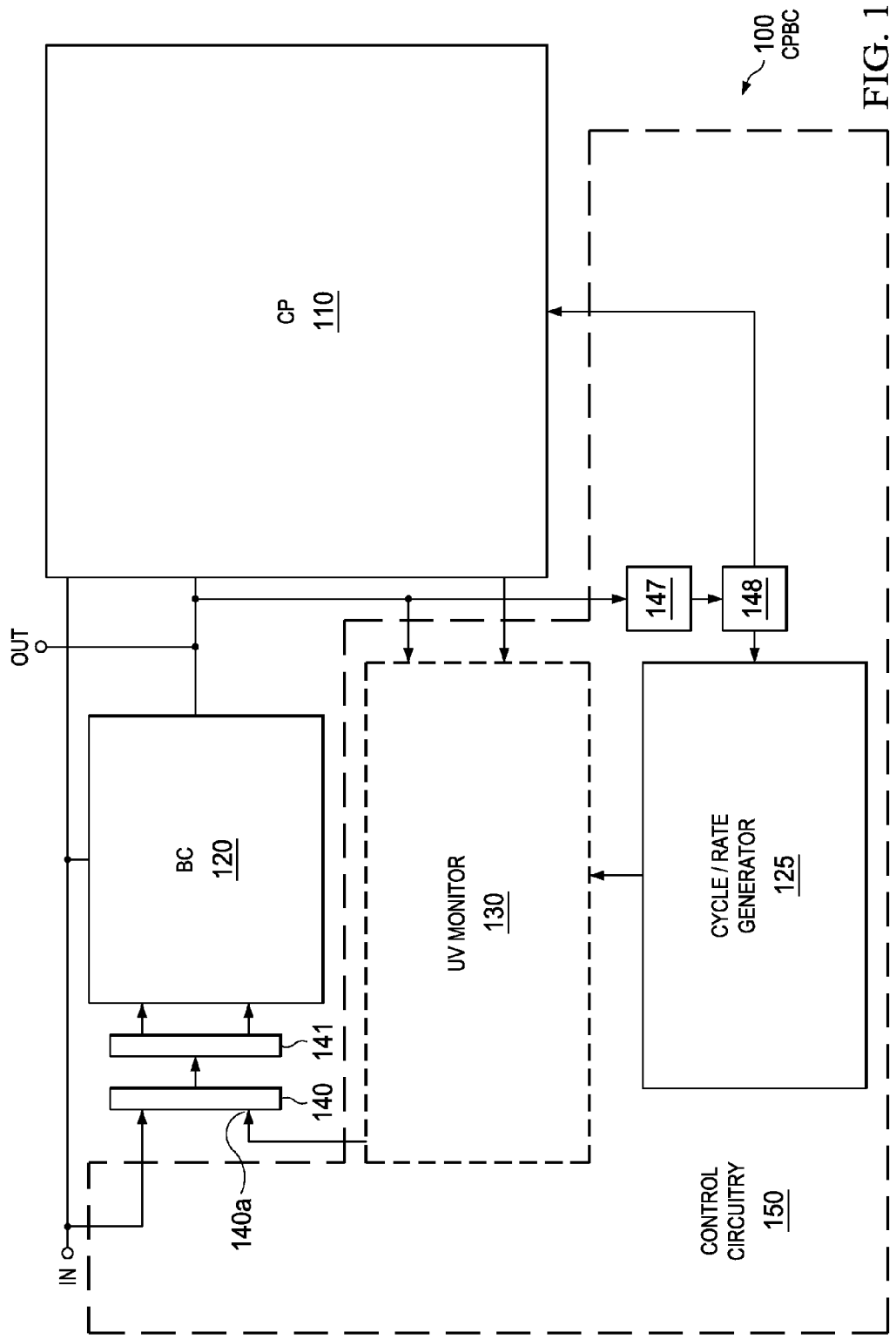
FIG. 1 is a block diagram representation of an example CPBC including a disclosed UV monitor block in the BC control loop for Vout droop reduction, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram representation of an example CPBC 100 including a step-up converter in the form of a CP stage 110 and a step-down converter in the form of a BC stage 120 connected in parallel with one another between IN and OUT, according to an example embodiment. The CP stage 110 and BC stage 120 each are both coupled to IN and to OUT, where at OUT a load (e.g., an electronic device) may be connected. CPBC 100 includes control circuitry 150 comprising a voltage sensor 147 for sensing Vout and a voltage level generator 148 for generating a first voltage level, and for generating a second voltage level>the first voltage level. In one embodiment, shown in FIG. 2 described below, the voltage divider 151 provides both the voltage sensor 147 and the voltage level generator 148 by receiving and dividing Vout, and providing a plurality of taps (nodes) including a tap providing the second voltage level and another tap providing the first voltage level.

The BC control loop also includes a duty cycle or repetition rate generator block (cycle/rate generator block) 125 having an input shown coupled to an output of the voltage level generator 148 which provides a duty cycle or repetition rate output that is coupled to an input of a UV monitor block 130. The UV monitor block 130 is triggered by a UV threshold and is coupled between OUT and an input 140a of control logic 140 that is coupled to a switch driver 141 which is coupled to drive a control node of power switch(es) in the BC stage 120. The UV monitor block 130 is for tracking Vout, where during a handoff between the CP stage 110 and BC stage 120 during power up if Vout drops below the UV threshold the duty cycle or repetition rate output is changed to provide a modified duty cycle or repetition rate output to the input 140a of the control logic 140 for increasing charging supplied to the inductor of the BC stage 120 to reduce a Vout droop.

Control circuitry 150 has inputs receiving Vout and Vin, and operates to control the operation of the BC stage 120 and CP stage 110 as described below. Control circuitry 150 can also receive one or more reference voltages (Vref) for use in its control of the BC stage 120 and CP stage 110 (see Vref shown in FIG. 2 described below).

In its general operation, control circuitry 150 enables the CP stage 110 to boost Vout as Vin powers up. At relatively low Vin, while CP stage 110 is boosting Vout the BC stage 120 is disabled by the control circuitry 150. As the Vin rises to above a certain threshold level, the control circuitry 150 enables the BC stage 120 to begin regulating Vout. The level at which the BC stage 120 regulates Vout is higher that the Vout level at which the control circuitry 150 disables the CP stage 110. The control loop associated with the BC stage 120 is designed to regulate to a slightly higher Vout compared to the Vout the control loop associated with CP stage 110 regulates to is to prevent both associated loops from "fighting" each other. The CP stage 110 can only supply charge, and cannot remove charge from Vout, so if the BC control loop regulates to a Vout, the CP control loop cannot undesirably fight with it to regulate to a lower Vout value (once the BC control loop has settled).

This overlap created between the BC stage 120 and the CP stage 110 ensures Vout is driven, and during periods which both BC stage 120 and CP stage 110 are charging Vout generally enables a smooth transition between the two modes of CP operation and BC operation. However, for relatively rapid Vin ramp rates relative to the BC control loop bandwidth, as noted above it is recognized Vout can experience a significant droop while the control loop is settling when handing off from the CP stage to the BC stage during voltage step down conversion, which is addressed by a disclosed UV monitor block 130 which causes enough energy to the inductor of the BC stage to maintain a higher Vout than the BC control loop would otherwise provide to minimize the Vout droop.

The CPBC 100 can be realized in a monolithic integrated circuit (IC), generally embedded within a larger-scale IC along with other functions, but alternatively as a stand-alone IC. Alternatively, some or all of the components of the CPBC 100 may be realized by discrete components, such as the inductor L and output capacitor Cout of the BC 120' shown in FIG. 2, as well as the capacitor shown as Cfly 115 in the CP stage 110'.

Figure 2:
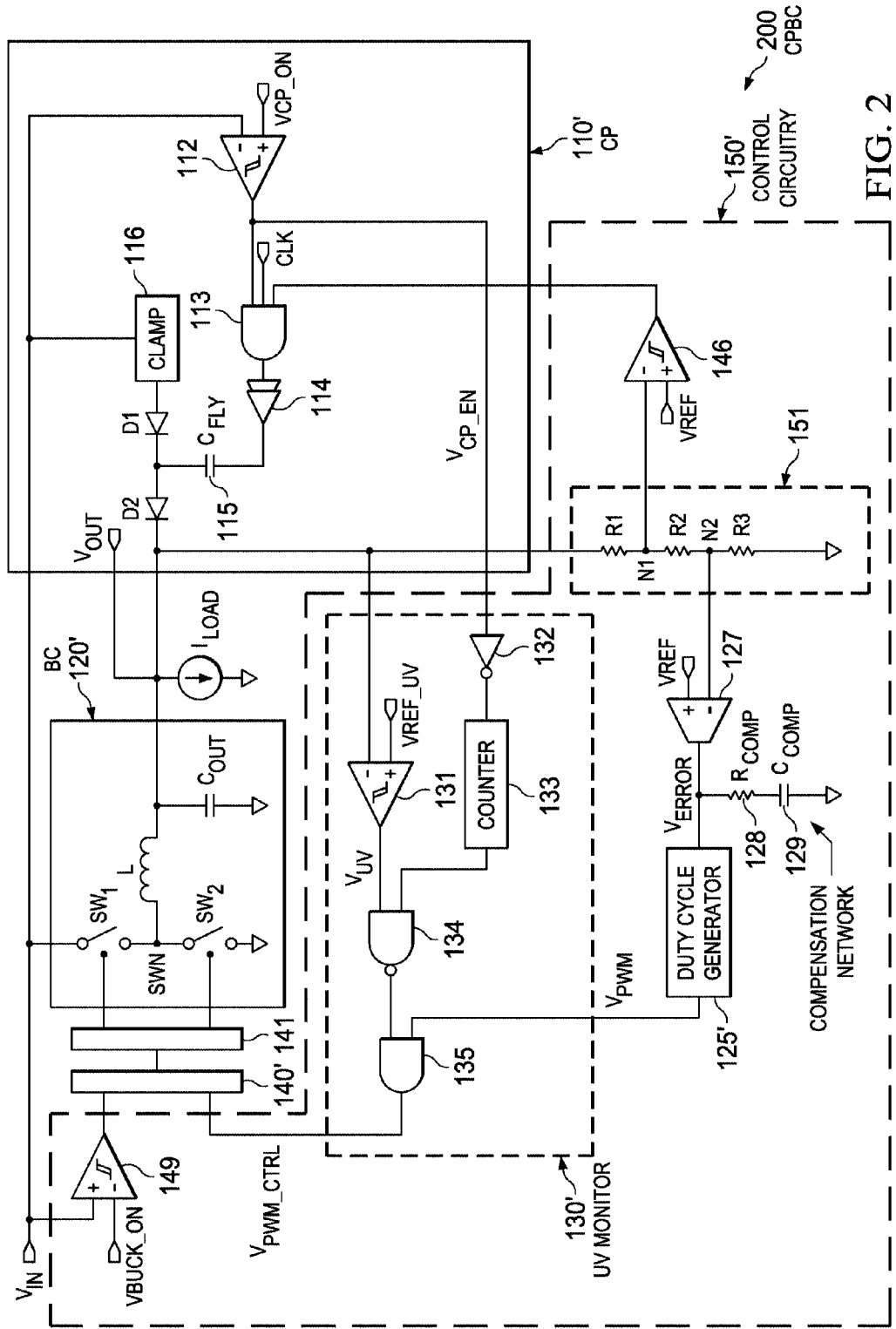
FIG. 2 shows an example circuit implementation for a disclosed CPBC including a disclosed UV monitor block in the BC control loop for Vout droop reduction which implements PWM control, according to an example embodiment.

CPBC 200 in FIG. 2 implements PWM control and shows example circuit implementations for the CP stage 110 shown as CP stage 110', BC stage 120 shown as BC stage 120', control circuitry 150 shown as control circuitry 150' including a voltage divider 151 providing both the voltage sensor 147 and the voltage level generator 148 shown in FIG. 1, duty cycle generator block 125', a UV monitor block 130' and a comparator 146 between the voltage divider 151 and CP stage 110'. The BC stage 120' is shown as a conventional buck mode voltage converter having power switches SW1, SW2 connected in series between IN and ground. As is typical in the art of power converters, power switches SW1, SW2 comprise power field effect transistors (FETs) with their source-drain paths connected in series, and their gates controlled by the PWM controller 140'. Insulated Gate Bipolar Transistors (IGBTs) may also be used for the power switches.

The particular construction of switches SW1, SW2 may follow any one of a number of conventional configurations, including that of a single FET, back-to-back paired FETs, and the like. Switch node SWN, being at the common node between switches SW1, SW2, is connected to one end of inductor L, the other end of which is connected to OUT. Filter capacitor shown as Cout is connected between OUT and ground. As evident from FIG. 2, no switching transistor is connected in series with inductor L between the switch node SWN and OUT which improves the power efficiency of disclosed CPBC's such as CPBC 200.

The control logic 140 associated with the BC stage 120' can correspond to conventional logic as used in buck mode voltage converters, but may be selectively enabled by control circuitry 150', specifically via its comparator 149 and the AND gate 135 in the UV monitor block 130' when needed to avoid a Vout droop during CP to BC handoff during power up as will be described in further detail below. When the BC stage 120' is enabled, control logic in the PWM controller 140' controls the switching of switches SW1 and SW2 in a complementary manner relative to one another, with the appropriate dead time between transitions to ensure both are not closed at the same time. The duty cycle of switches SW1, SW2 will control Vout relative to that at IN in the conventional manner. Specifically, during such time as switch SW1 is closed and switch SW2 is open, inductor L is energized by current from input terminal IN; conversely in this embodiment, during such time as switch SW1 is open and switch SW2 is closed, the current stored by inductor L is applied to load at OUT. Cout operates effectively as a filter capacitor, reducing ripple in Vout. In this embodiment, the switching duty cycle is controlled by feedback from OUT via control circuitry 150', specifically via its comparator 149 as will be described in further detail below.

Alternatively, switch SW2 may be replaced by a diode (e.g., with its cathode at switch node SWN and its anode at ground), as known in the art for buck voltage converters. In this case, PWM controller 140' will control only switch SW1. During those portions of the switching cycle in which switch SW1 is open, current stored by inductor L will similarly be applied to the load at OUT, in the manner described above. Other alternatives to the construction of the BC stage 120' are also possible.

The CP stage 110' shown in FIG. 2 has IN coupled to a diode chain comprising a pair of diodes D1 and D2 coupled in series between IN and OUT by way of optional clamp circuit 116 as shown in FIG. 2. Clamp circuit 116 can be a conventional clamp circuit that limits the voltage to which the CP stage 110' can boost Vout relative to Vin. For example, clamp circuit 116 may be realized as a voltage-controlled switch (i.e., transistor circuit) that is closed while Vin is below a certain threshold level, and that is open while the Vin is above that threshold level. While clamp circuit 116 is optional (i.e., the diode chain may be directly connected to IN), it provides the advantage of limiting current drawn by the CP stage 110' during normal CPBC operation.

The operation of CP stage 110' is driven by clock signal CLK, which is generated elsewhere within the integrated circuit in which most or all of the components of CPBC 200 is realized, or external to that integrated circuit. Clock signal CLK is applied to one input of AND gate 113 (which receives a signal from control circuitry 150' as will be described in detail below), the output of which is applied to buffer chain 114. The output of buffer chain 114 is applied to one side of the capacitor shown as Cfly 115, the other side of which is connected to a node between D1 and D2.

In operation, clock signal CLK is applied to AND gate 113 at the desired frequency and duty cycle. When CP stage 110' is enabled (i.e., while control circuitry 150' applies a high logic level to AND gate 113), that clock signal CLK is forwarded by AND gate 113 to buffer chain 114. During portions of the clock cycle in which buffer chain 114 presents a low logic level (i.e., ground) at its output, Cfly 115 charges to a voltage corresponding to Vin, less a threshold voltage drop across D1 and any voltage drop across clamp circuit 116. As clock signal CLK makes its next transition, buffer chain 114 drives its output to a high level, which "pumps" the voltage at the anode of D2 to a yet higher voltage (its charged voltage plus the high level voltage at the output of buffer chain 114), because the voltage across Cfly 115 cannot change instantaneously. Since D2 is forward-biased at this time, that higher voltage is applied to OUT, and is maintained at that level during the opposite phase of clock signal CLK by the action of D2. This operation continues so long as CP stage 110' remains enabled, to the extent allowed by clamp circuit 116 as described above.

BC stage 120' may alternatively be constructed and operate according to other conventional arrangements of buck voltage converters. Similarly, the CP stage 110' may alternatively be constructed and operate according to other arrangements of charge pump circuits besides the diode-based two-stage construction described above. Such alternatives and other variations of the particular arrangement of these stages 120', 110', as useful in the construction of CPBC 200, as will be recognized by those skilled in the art having reference to this application.

As mentioned above in connection with control logic of the BC stage 120', control circuitry 150' includes comparator 149, which may be constructed in the conventional manner. In this implementation, comparator 149 receives Vin at its positive input and input reference voltage $V_{BUCK\_ON}$ at its negative input, and has its output coupled to an input of control logic 140.' Input reference voltage $V_{BUCK\_ON}$ is a reference voltage generated elsewhere within the integrated circuit in which CPBC 200 is realized, or external thereto, typically by a conventional bandgap reference voltage circuit or another type of conventional voltage regulator or other reference circuit, as known in the art. Input reference voltage $V_{BUCK\_ON}$, as applied to comparator 149 establishes the input voltage at which the BC stage 120' is enabled.

In the example shown in FIG. 2, responsive to Vin being at a voltage above input reference voltage $V_{BUCK\_ON}$, comparator 149 drives its output to a high logic level to enable control logic of the PWM controller 140' and BC stage 120', specifically by enabling control logic of the PWM controller 140' to control switches SW1, SW2 to apply power received at IN to OUT via inductor L in the manner described above. Conversely, in this embodiment of the invention, when the BC stage 120' is disabled by comparator 149 in response to the voltage at IN being below input reference voltage $V_{BUCK\_ON}$, control logic of the PWM controller 140' holds both of switches SW1, SW2 open.

Voltage divider 151 is shown comprising R1, R2 and R3, in series connection between OUT and a reference supply voltage (e.g., ground). The voltage divider 151 defines two nodes (or taps) N1, N2 at junctions between its series-connected resistors, with node N1 defined at a point closer to OUT than node N2 to provide the second voltage level. In the arrangement of FIG. 2, when Vout has a positive polarity relative to ground, the voltage at node N1 (the second voltage level) will be higher than the voltage at node N2 (the first voltage level) for any non-zero Vout.

Node N1 is applied to the negative input of comparator 146 of the control circuitry 150', and reference voltage Vref is applied to the positive input of the comparator 146. Reference voltage Vref applied to comparator 146 will typically differ from the input reference voltage $V_{BUCK\_ON}$ shown applied to the negative input of the comparator 149, to allow design of the voltage at which BC stage 120' is enabled independently from the regulated output voltages, as will be described below. However, it is not required that these two voltages differ from one another. The output of comparator 146 is applied to one input of the AND gate 113 of the CP stage 110'. In response to the voltage at node N1 being below reference voltage Vref, the high level at the output comparator 146 enables the AND gate 113 to respond to clock signal CLK, thus enabling operation of CP stage 110'. Conversely, upon Vout rising to a level that brings the voltage at node N1 above reference voltage Vref, comparator 146 issues a low level to AND gate 113, which blocks clock signal CLK from being applied to buffer chain 114 and capacitor Cfly effectively disabling the CP stage 110'.

Node N2 in voltage divider 151 is connected to a negative input of amplifier 127 in control circuitry 150', where the positive input of amplifier 127 receives Vref, and the output of amplifier 127 shown as Verror is coupled to an input of a duty cycle generator block 125' and to a compensating network comprising Rcomp 128 and Ccomp 129 to ground. The output of the duty cycle generator block 125' shown as $V_{PWM}$ is coupled to one input of AND gate 135 of the UV monitor block 130'.

The UV monitor block 130' is shown in FIG. 2 including a UV comparator (comparator) 131 with its positive input receiving $V_{REF\_UV}$ and its negative input coupled to OUT to receive Vout, and an inverter 132 receiving a CP enable signal shown as $V_{CP\_EN}$ from the comparator 112 of the CP stage 110'. The UV threshold ($V_{REF\_UV}$), should generally have hysteresis (of at least 1 mv) and be below the regulation point to allow the BC control loop to settle. UV monitor block 130' is also shown including a UV counter or timer (counter) 133 having an input coupled to receive the output from inverter 132. A NAND gate 134 receives the output from the counter 133 and the Vuv output from comparator 131. The output of NAND gate 134 and the $V_{PWM}$ output from the duty cycle generator block 125' are coupled to respective inputs of AND gate 135. The output of the AND gate 135 is shown as $V_{PWM\_CTRL}$ which is coupled to an input of the PWM controller 140'. Other logic arrangements are possible for UV monitor block 130'.

As noted above, the UV monitor block 130' being coupled to Vout tracks Vout, wherein during a handoff at power up between the CP stage 110' and the BC stage 120' if Vout drops below the UV threshold shown in FIG. 2 as $V_{REF\_UV}$, the UV monitor block 130' modifies $V_{PWM}$ provided by the duty cycle generator block 125' by the action of AND gate 135 with the $V_{PWM\_CTRL}$ from the NAND gate 135 which is coupled to the controller input 140a of the PWM controller 140' that functions to increase the charging supplied to the inductor L of the BC stage 120, 120' to raise Vout. The $V_{PWM\_CTRL}$ output from the AND gate 135 as shown in FIG. 2 is thus forced to be logic low regardless of what the duty cycle generator block 125' outputs as $V_{PWM}$ so that the BC control loop does not see $V_{PWM}$ and acts as if it needs to charge the inductor L more. By keeping the inductor L charged more than what the BC control loop needs, Vout is kept from drooping.

The counter 133 starts after the CP stage 110' disables to let the comparator's 131 $V_{UV}$ output through. To avoid "fighting" with the BC control loop during normal converter operation, $V_{UV}$ is ignored after the counter time of counter 133 expires. The counter time is set to a time to be long enough to let the BC stage settle. The counter 133 in the UV monitor block 130' thus functions to ensure that after handoff during power up, the UV monitor block 130' is ignored so that it does not affect normal operation of the CPBC and is only active during CP to BC handoff at power up. There are other ways that should be apparent to one having ordinary skill in the art besides the counter 133 to achieve this function of avoiding interference by the UV monitor block 130' during normal converter operation.

Disclosed Vout droop reduction is particularly useful for similar DC-DC converter systems where the buck control is compensated and not hysteretic. If the buck converter uses hysteretic control, conventional control loops may suffice. The control circuitry 150, 150' including a UV monitor block 130, 130' is adapted to take care of the complexity a compensated feedback loop involves in the compensation network taking significant time to settle as compared to the relatively fast ramp rate of Vin that without a disclosed UV monitor block 130, 130' will try to regulate to a low voltage during the handoff from CP to BC at power up resulting in a Vout droop (see the Vout droop in the simulation results shown in FIG. 3A described below).

One particular application for disclosed embodiments is for the Texas Instruments' TPS65980 DC/DC switching regulator (THUNDERBOLT™ Bus Power Management IC (PMIC)) that receives input power from a THUNDERBOLT™ or THUNDERBOLT™ 2 power bus ranging from 2.5V to 15.75V and generates three separate 3.3V supply outputs.

Examples

Disclosed embodiments are further illustrated by the following specific Examples, which should not be construed as limiting the scope or content of this Disclosure in any way.

Simulations were performed to evaluate the voltage vs. time handoff performance from CP stage to the BC stage during power up for CPBC 200 shown in FIG. 2 having a disclosed UV monitor 130' for Vout droop reduction vs. an otherwise equivalent CPBC that only lacked a disclosed UV monitor 130 (control CPBC).

Regarding the simulations conditions used, $V_{REF}$=1 V; $V_{CP\_ON}$=3.695 V (when the CP stage 110' is disabled) so that the CP stage 110' is ON until Vin was about 3.7 V; $V_{BUCK\_ON}$=3.459 V (when the BC stage 120' is enabled, so the BC stage 120' turns ON when Vin=3.46 V); $V_{RESET\_N}$=3.1 V rising, 2.6 V falling (the reset voltage that was applied to a REST_N comparator (not shown in FIG. 2). The REST_N comparator would be configured to have its positive input to Vout and its negative input to a voltage reference equal to its trip point. $V_{RESET\_N}$ is a threshold in this particular system (e.g., a THUNDERBOLT™ system) that when applied to the REST_N comparator allows the other chips in the system to receive a signal which indicates whether the power rails were active or not, where the CPBC resets if Vout drops below 2.6V during a transition. $V_{REF\_UV}$=3.16 V so that the UV signal trips the comparator 131 in the UV monitor block 130' when Vout drops below 3.16 V. Regarding the compensation network in the BC control loop Ccomp 129 was 10 nF and Rcomp 128 was 10 kohms. Regarding the counter 133', the counter design was an adjustable counter, nominally set to a counter time of 2 msec.

Figure 3A:
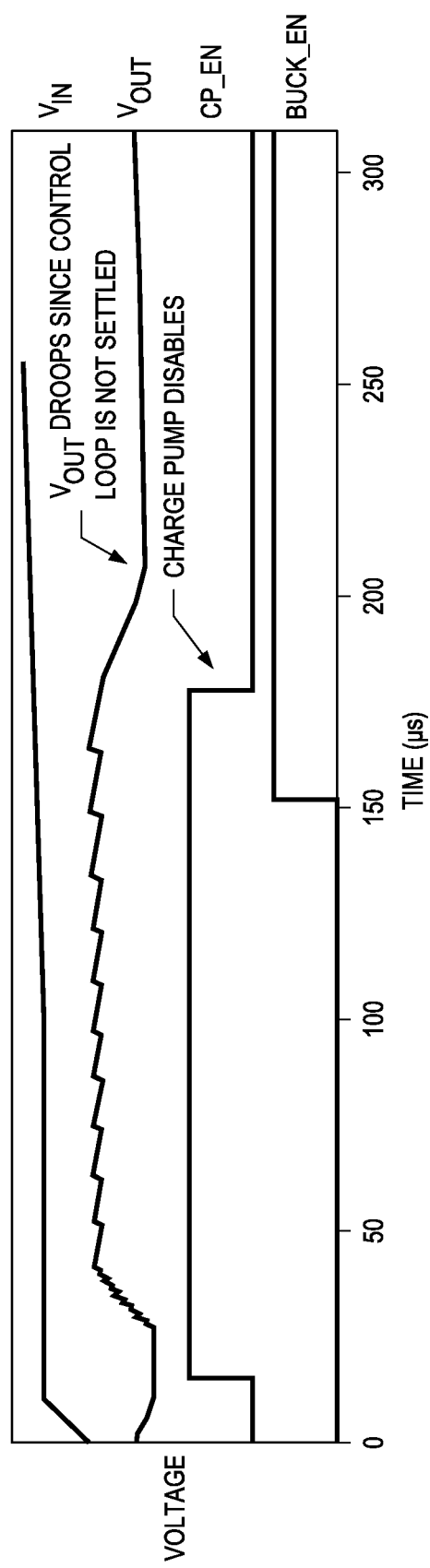
FIGS. 3A and 3B are simulation results showing the voltage vs. time handoff performance from CP stage to BC stage during charge up for the CPBC shown in FIG. 2 having a disclosed UV monitor block for Vout droop reduction vs. an otherwise equivalent CPBC that only lacked a disclosed UV monitor (a control CPBC).

As seen in the waveforms shown in FIG. 3A for the control CPBC as Vin rises during power-up, the BC stage 120' can be seen to power up (at about 150 μsec) and start driving Vout. In converter systems where the BC stage uses a typical compensated PWM or PFM control loop, the BC control loop needs time to settle after it is enabled. The delay time (to settle) depends on the system bandwidth. If the rising ramp rate of Vin is slow enough, the CP stage will keep Vout up until the BC control loop settles and drives Vout to the regulated voltage. However, if the rising ramp rate of Vin is faster than the BC control loop bandwidth as shown in FIG. 3A, the CP stage 110' disables (shown at about 175 μsec when CP_EN goes low) before the BC stage 120' is settled. This causes the Vout droop shown in FIG. 3A as the BC stage 120' regulates to a lower voltage at first and as the BC control loop settles Vout slowly rises as the BC stage regulates to intended voltage.

Figure 3B:
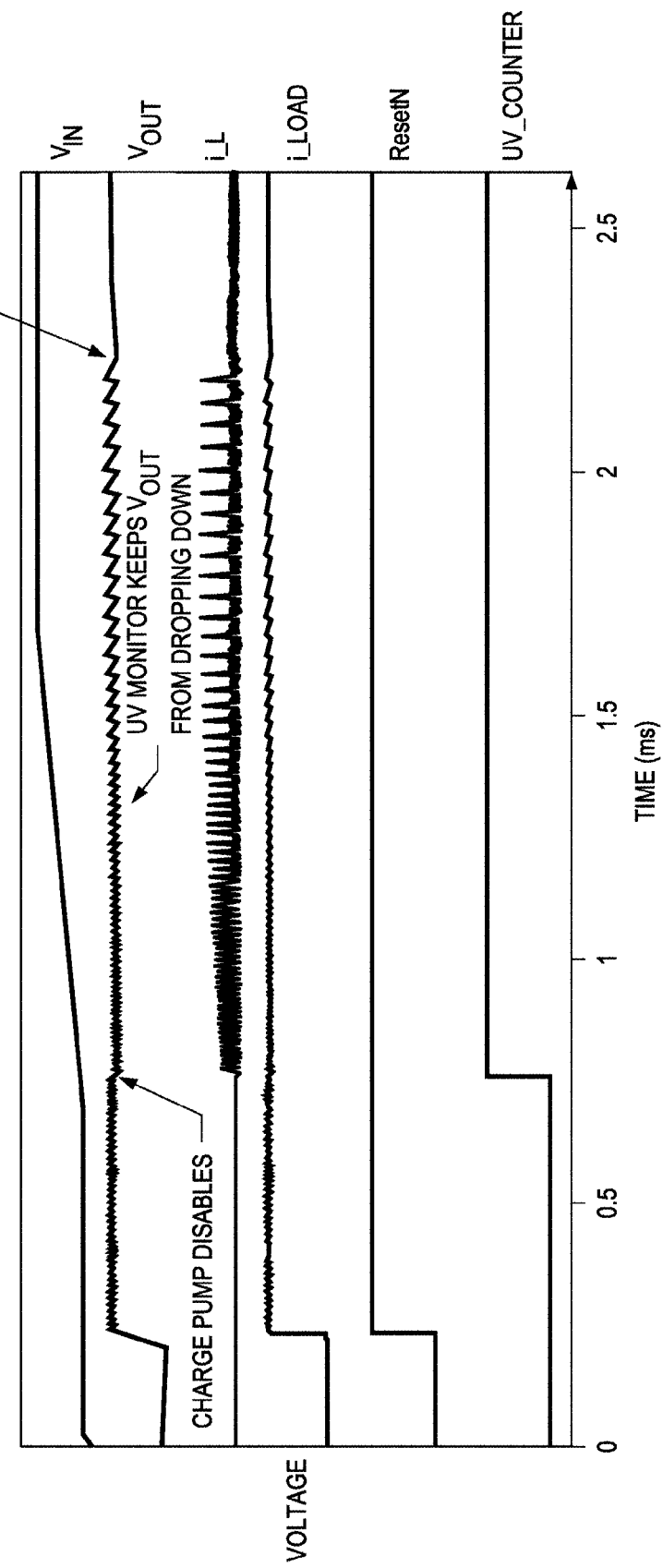

As seen in the waveforms for CPBC 200 in FIG. 3B, the voltage vs time performance during handoff from the CP stage 110' to the BC stage 120' is shown to have essentially no Vout droop. FIG. 3B also shows simulated inductor current i_L and load current i_LOAD (compared to FIG. 3A). Although the time scales in FIGS. 3A and 3B are different, there is essentially no significance for the time scale as for the simulation results shown in FIG. 3A the simulation was ended soon after the Vout droop behavior occurred. For CPBC 200, due to addition of the UV monitor block 130' including the counter 133, the settling time may increase slightly. Thus, in order to show that the CP to BC handoff was stable and working well, the simulation was run for a longer time (to 2.5 msec).

The waveforms in FIG. 3B show a smooth step-down conversion with Vout shown having a minimal Vout droop, where the action of the UV monitor block 130' can be seen to keep Vout from dropping down as the UV monitor block 130' overrides the PWM signal ($V_{PWM}$ output by the duty cycle generator 125') to force the L to charge enough to maintain the Vout high. After handoff, the BC control loop settles and the BC stage 120' regulates Vout to intended voltage. The i_L waveform shown is significant because it shows how the inductor current is kept energized to maintain Vout, even though the BC control loop is not yet settled. In other words, the UV signal ($V_{UV}$) output by the comparator 131 forces the inductor L to be charged, regardless of what the BC control loop tries to do. This is done until the BC control loops settles to where it should be and takes over of the control of the i_L (peaks go away). If the time scale were extended at least another 0.5 msec, the counter 133 would be seen to go low to disable the UV monitor block 130'.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of power conversion, the method comprising:
    using a charge pump buck converter (CPBC) that includes:
        a charge pump (CP) stage; a buck converter (BC) stage connected in parallel with said CP stage between an input terminal (IN) and an output terminal (OUT); control logic coupled through a switch driver to a least one control node of at least one power switch for driving an inductor of said BC stage; and control circuitry including a duty cycle or repetition rate generator block (cycle/rate generator block);
    wherein using said CPBC includes:
        providing a first voltage level, which is coupled to said CP stage;
        providing a second voltage level, which is coupled to said cycle/rate generator block, said first voltage level being above said second voltage level;
        using said cycle/rate generator block to provide a duty cycle or repetition rate output coupled to an input of an under voltage (UV) monitor block, wherein said UV monitor block includes a UV comparator triggered by a UV threshold and is coupled between said OUT and an input of said control logic;
        during a power up, when a voltage at said IN (Vin) is rising with time:
            applying clock signals to said CP stage to increase a voltage at said OUT (Vout);
            responsive to said Vout exceeding a first output voltage level (first Vout level), disabling said CP stage;
            responsive to said Vin exceeding an input reference voltage, controlling said BC stage to regulate said Vout at a second Vout level that is above said first Vout level;
        tracking said Vout using said UV monitor block; and
        during a handoff between said CP stage and said BC stage during said power up, if said Vout drops below said UV threshold, using said UV monitor block to modify said input of said control logic to increase charging supplied to said inductor.

2. The method of claim 1, wherein using said CPBC includes:
    using a voltage divider coupled between said OUT and a ground to: provide said first voltage level, which is coupled through a first tap to said CP stage; and provide said second voltage level, which is coupled through a second tap to said cycle/rate generator block.

3. The method of claim 1, further comprising ignoring said UV monitor block so that said control circuitry operates without influence from said UV monitor block except during said handoff.

4. The method of claim 1, wherein said ignoring is implemented with a counter having a counter time that is triggered by an enable signal sent upon said disabling of said CP stage.

5. The method of claim 4, wherein said counter time is >a time for said BC stage to settle.

6. The method of claim 1, wherein said UV threshold ($V_{REF\_UV}$) has hysteresis and is below a regulation point to allow said control circuitry to settle.

7. The method of claim 1, wherein said cycle/rate generator block comprises a pulse width generator block and said control logic comprises a pulse width modulation (PWM) controller.

8. The method of claim 1, wherein said cycle/rate generator block comprises a duty cycle generator block and said control logic comprises a pulse frequency modulation (PFM) controller.

9. The method of claim 7, wherein said CPBC further comprises a compensation network including a compensation capacitor between an input of said PWM controller and a ground.

10. A charge pump buck converter (CPBC), comprising:
    a charge pump (CP) stage;
    a bunk converter (BC) stage connected in parallel with said CP stage between an input terminal (IN) and an output terminal (OUT) of said CPBC, including at least one power switch for driving an inductor;
    control logic coupled through a switch driver to at least one control node of said at least one power switch; and
    control circuitry coupled to said OUT for: sensing a voltage at said OUT (VOUT); providing a first voltage level, which is coupled to said CP stage; providing a second voltage level, which is coupled to a duty cycle or repetition rate generator block (cycle/rate generator block), said first voltage level being above said second voltage level, wherein said cycle generator block is for providing a duty cycle Or repetition rate output coupled to an input of an under voltage (UV) monitor block, and wherein said UV monitor block includes a UV comparator triggered by a UV threshold and is coupled between said OUT and an input of said control logic; disabling said CP stage responsive to said Vout exceeding a first Vout level; and controlling said BC stage to regulate said Vout at a second Vout level that is above said first Vout level;
    wherein said UV monitor block is for: tracking said Vout; and, during a handoff between said CP stage and said BC stage during a power up, if said Vout drops below said UV threshold, modifying said input of said control logic to increase charging supplied to said inductor.

11. The CPBC of claim 10, wherein:
    said control circuitry includes a voltage divider coupled between said OUT and a ground; and
    said voltage divider includes: a first tap for providing said first voltage level; and a second tap for providing said second voltage level.

12. The CPBC of claim 10, wherein said UV monitor block further includes logic so that said control circuitry operates without influence from said UV monitor block except during said handoff.

13. The CPBC of claim 12, wherein said UV monitor block further comprises a counter having a counter time that is triggered by an enable signal sent upon said disabling of said CP stage.

14. CPBC of claim 10, wherein said UV threshold ($V_{REF\_UV}$) has hysteresis and is below a regulation point to allow said control circuitry to settle.

15. The CPBC of claim 10, wherein said cycle/rate generator block comprises a pulse width generator block and said control logic comprises a pulse width modulation (PWM) controller.

16. The CPBC of claim 10, wherein said cycle/rate generator block comprises a duty cycle generator block and said control logic comprises a pulse frequency modulation (PFM) controller.

17. The CPBC of claim 15, further comprising a compensation network including a compensation capacitor between an input of said PWM controller and a ground.

* * * * *